MECHANICAL MEMORY UNIT WITH AUTOMATIC CONTROL

Filed April 29, 1965 6 Sheets-Sheet 1

INVENTOR.
RALPH V. BENNETT
BY
John D. Wilkins
ATTORNEY

MECHANICAL MEMORY UNIT WITH AUTOMATIC CONTROL

Filed April 29, 1965 6 Sheets-Sheet 2

INVENTOR.
RALPH V. BENNETT
BY
John D. Wilkins
ATTORNEY

INVENTOR.
RALPH V. BENNETT
BY
John D. Wilkins
ATTORNEY

MECHANICAL MEMORY UNIT WITH AUTOMATIC CONTROL

Filed April 29, 1965 6 Sheets-Sheet 4

INVENTOR.
RALPH V. BENNETT

BY

John D. Wilkins
ATTORNEY

Sept. 26, 1967 R. V. BENNETT 3,343,788

MECHANICAL MEMORY UNIT WITH AUTOMATIC CONTROL

Filed April 29, 1965 6 Sheets-Sheet 5

NORMAL CYCLE OF OPERATION. NO VALUE STORED

RECALL CYCLE OF OPERATION: NO VALUE STORED

INVENTOR.
RALPH V. BENNETT

BY John D. Wilkins

ATTORNEY

MECHANICAL MEMORY UNIT WITH AUTOMATIC CONTROL

Filed April 29, 1965 6 Sheets-Sheet 6

NORMAL CYCLE OF OPERATION. VALUE STORED

RECALL CYCLE OF OPERATION. VALUE STORED

INVENTOR.
RALPH V. BENNETT
BY
John D. Wilkins
ATTORNEY 3,343,788
MECHANICAL MEMORY UNIT WITH AUTOMATIC CONTROL Ralph V. Bennett, Norwalk, Conn., assignor to Sperry Rand Corporation, New York, N.Y., a corporation of Delaware Filed Apr. 29, 1965, Ser. No. 451,946
7 Claims. (Cl. 235—60)

This invention relates to data storage and recall devices for machines and more particularly to mechanical memory units of the gear wheel type, such as those commonly found in office machines, provided with automatic recall and storage controls therefor.

Many office machines, such as calculators, computers, card readers, etc., incorporate mechanical memory units, in the form of a plurality of gear type wheels, adapted to be selectively rotated to positions indicative of a value entered into the office machine or stored in the conventional registers of the machine, for subsequent use in its operation. The incorporation of such memory units in office machines has however, in most instances, greatly affected the cost of efficiency of operation thereof due to the inclusion of considerable and usually expensive structure necessitated for the proper control and operation of such memory units.

Most office machines require what is commonly referred to as a differential mechanism to transmit the value entered into the machine from the entry mechanism thereof (keyboard, pinbox, card reader, etc.); to either one or more other mechanisms of the machine (registers, printers, etc.), between such other mechanisms, or from such other mechanisms back to the value entry mechanism. Such differential transfer mechanisms usually take the form of racks having one or more sets of gear teeth formed in appropriate positions thereon; the racks having either a straight or a curved configuration. Operator actuation of an appropriate cycle initiating mechanism, or actuation thereof by another mechanism of the office machine, sets into motion the various instrumentalities of the machine and initiates movement of the racks from a rest position, in a forward (value receiving) direction until such movement is arrested by either the value entry mechanism, the register, or by other mechanisms provided for this purpose. The machine cycle then continues with the racks moving in a restoring (value entering) direction back to their rest positions; the latter movement usually coincides or is shortly followed by termination of the machine cycle.

In many prior office machines, there are differentially settable gear wheel memory units for cooperation with the aforesaid racks. These wheels are normally maintained out of engagement with the differential racks and in order to enter a value therein the operator must initiate operation of appropriate structure to: (1) return the memory wheels to zero condition; (2) move the memory wheels into engagement with the racks (usually at mid-cycle); (3) maintain the memory wheels in engagement with the racks for a predetermined period (usually during the return movement thereof) to receive the value entered therein; (4) move the memory wheels back out of engagement with the racks; and (5) latch the memory wheels in their set positions to retain the value entered therein.

Subsequent use of the value so entered into the memory unit also necessitates positive action to: (1) prevent return of the memory wheels to zero condition; (2) move the memory wheels into engagement with the racks (usually just prior to the forward movement thereof); (3) maintain the memory wheels in engagement with the racks for a predetermined period (during either both the forward and return movement of the racks if the value is to be reentered into the memory unit, or during only the forward movement of the racks if the value is not to be so reentered); (4) move the memory wheels back out of engagement with the racks; and (5) latch the memory wheels in their set positions.

The control structure required for the hereinbefore described movements of the memory unit wheels or to maintain them against such movements, is obviously quite complex and expensive and greatly adds to the basic cost of the office machine as well as to the cost of servicing. In addition, the use of such memory units requires a complex routine of action on the part of the operator, otherwise the value which is to be entered into the memory unit will not be entered.

Modern business practice, however, dictates the use of office machines which provide for automatic entry into a memory unit of each value entered into the machine without action on the part of the operator.

Here again prior memory units, in most instances, are normally maintained out of engagement with the differential rack mechanism, and upon initiation of a machine operation (when the value in the memory unit is not to be used) the memory unit must first have the value just previously entered removed therefrom; must then have the gear wheels thereof moved into engagement with the differential rack mechanism (usually of the mid-cycle position thereof); maintained in engagement with the differential rack mechanism during the return movement thereof; moved out of engagement with the differential rack mechanism at the termination of said return movement; and latched against inadvertent upsetting of the value so entered therein. When the value in the memory unit gear wheels is to be entered into the office machines said value must not be removed therefrom; the memory unit must be moved into engagement with the differential rack mechanism (usually at the initiation of the forward movement thereof); must be maintained in engagement with the rack mechanism to control the extent of the movement thereof and, if desired, so as to again receive the value therefrom for subsequent use, must be returned out of engagement with said rack mechanism at the termination of the return movement thereof; and must be latched to prevent inadvertent upsetting of the entered value. If the value entered in the memory unit is not to be used, and is not to be disturbed, then the memory unit must be maintained out of engagement with the differential rack mechanism during both the forward and the return movements thereof.

Heretofore, the control structure required for the hereinbefore described movements of the automatic entry memory unit, or for maintenance of such memory unit in a position out of engagement with the differential rack mechanism, have also been quite complex and expensive.

Modern business practice also dictates that every value so entered automatically into a memory unit be retrievable by merely initiating conventional operation of the machine without the use of special keys. However, in accomplishing these ends the machine operation has been made so complex that operators often must either resort to a guide in order to operate the proper controls in the proper order or hazard an improper operation and loss of stored value.

It is therefore an object of this invention to provide a new and improved mechanical memory unit with automatic entry into the unit and simplified controls for storage and recall, and to provide automatic erasure of values so entered, if not selected for either storage or recall.

Another object is to provide an office machine with an improved mechanical memory unit and simplified controls therefor to automatically receive each transacted value entered into the transfer mechanism of the machine from one of a keyboard entry and read-out (as of a total) for automatic recalling, on a single cycle recall basis, of any value so last entered or totalled by merely initiating machine operation through the normal machine operation initiating structure and without the use of special mechanism, thereby eliminating need for a recall key.

Another object is to provide a calculating machine with a mechanical memory of the gear wheel type and simplified controls therefor to automatically receive each value so entered or totalled for transfer and to store any preselected value so entered or totalled for any number of cycles of operation of the machine, regardless of entry or read-out of any other values in the machine during said number of cycles, and to make automatic, keyless recall of said stored preselected value by merely initiating machine operation through the normal function initiating structure of the office machine.

Another object is to provide an office machine with an improved mechanical memory unit and simplified controls therefor to automatically receive from the differential transfer mechanism each value read out or entered into the office machine and store any value so entered or read out either for a cycle, or more cycles regardless of the entry or read-out of other values into the machine transfer mechanism after depressing a storage key to make keyless recall of this value possible and make release of the storage key automatic upon such recall.

Yet another object for a calculator having an entry keyboard and the usual function keys, including a total key, is to eliminate the need for a recall key by making machine function key operation effect recall when no other entry or read-out is involved.

Yet another object is to provide keyless recall while providing a key for selective storage releasable automatically upon recall so as to eliminate the need for manual release of the storage key.

These and other objects, features, and advantages of the invention will be seen from the following description of a preferred embodiment when considered in conjunction with the accompanying drawings, in which.

Figure 1:
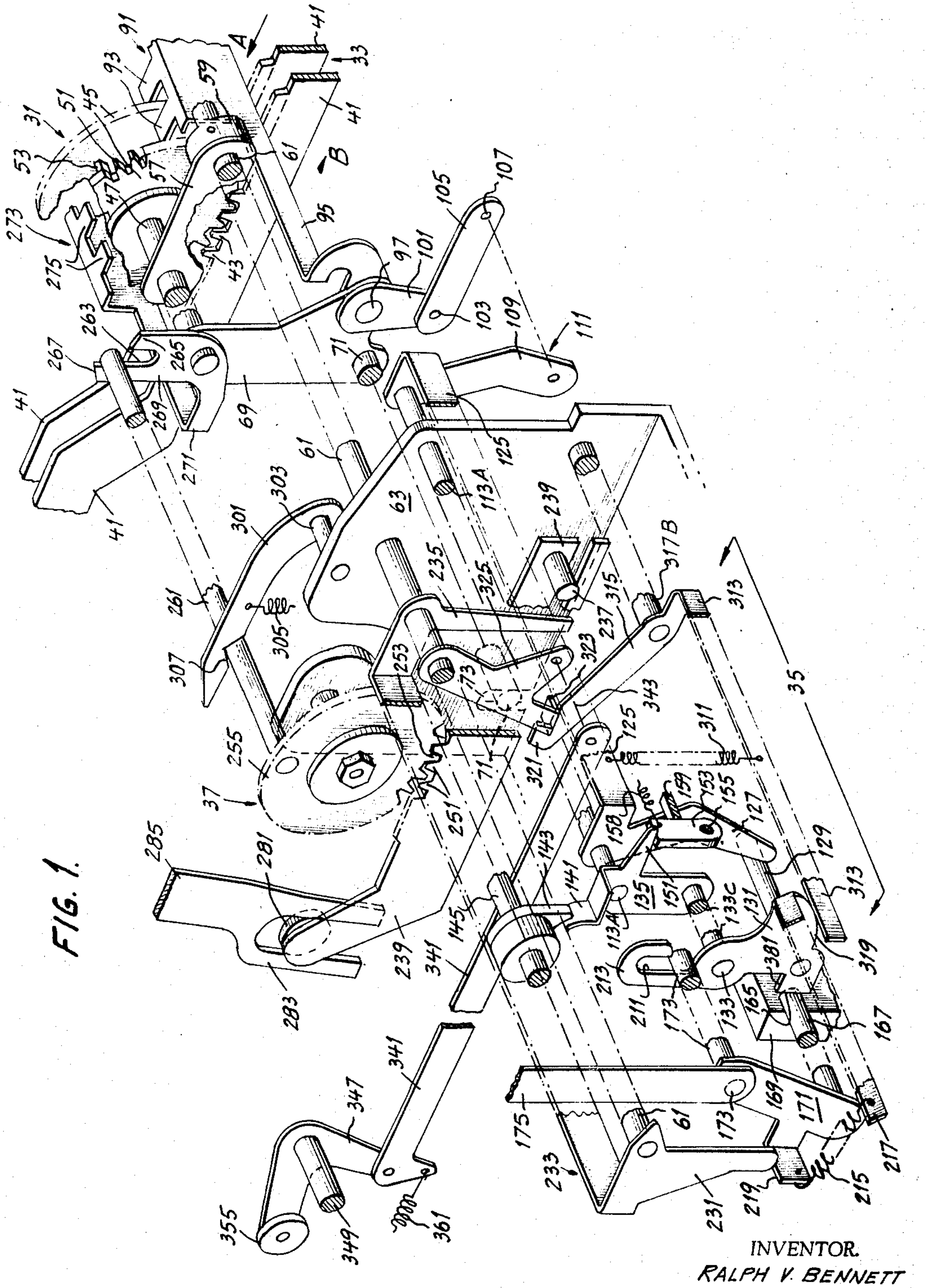
FIG. 1 is an exploded perspective view of a portion of an office machine, embodying the present invention, cut away in part to better show details thereof.
Figure 8C:
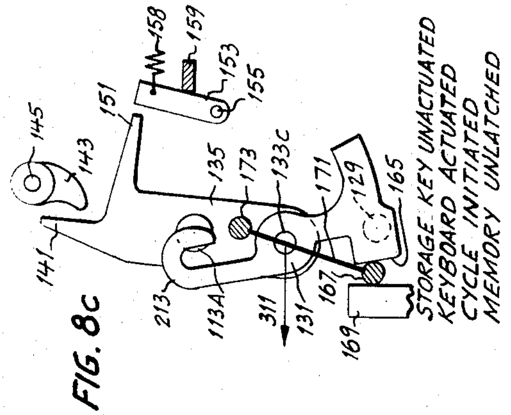
Figure 8B:
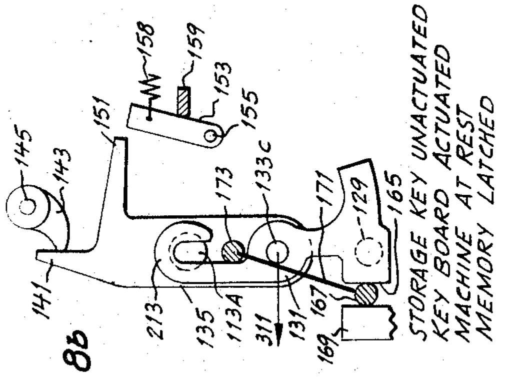
Figure 8A:
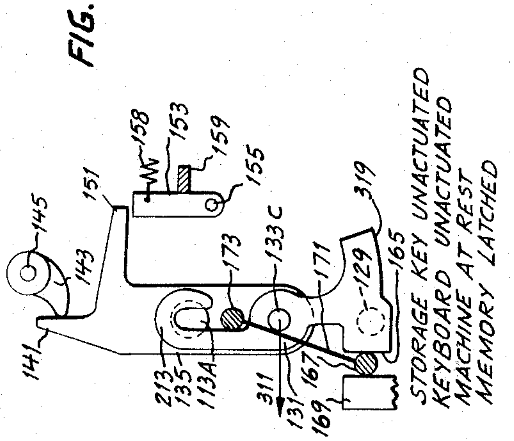
Figure 9B:
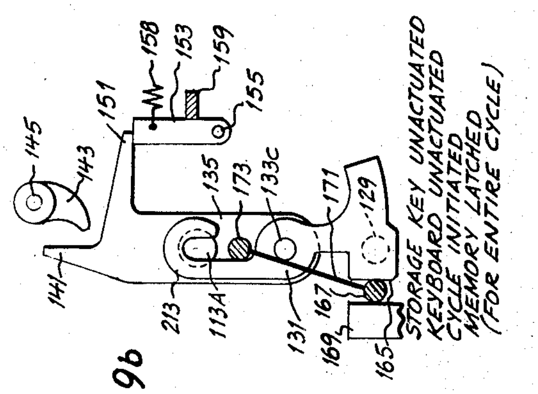
Figure 9A:
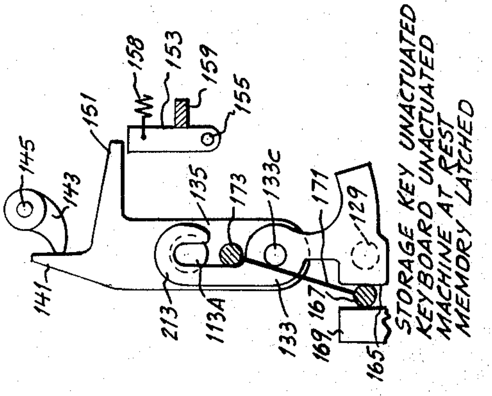
Figures 10A, 10B, 10C, 11A, 11B, 11C, 11D:
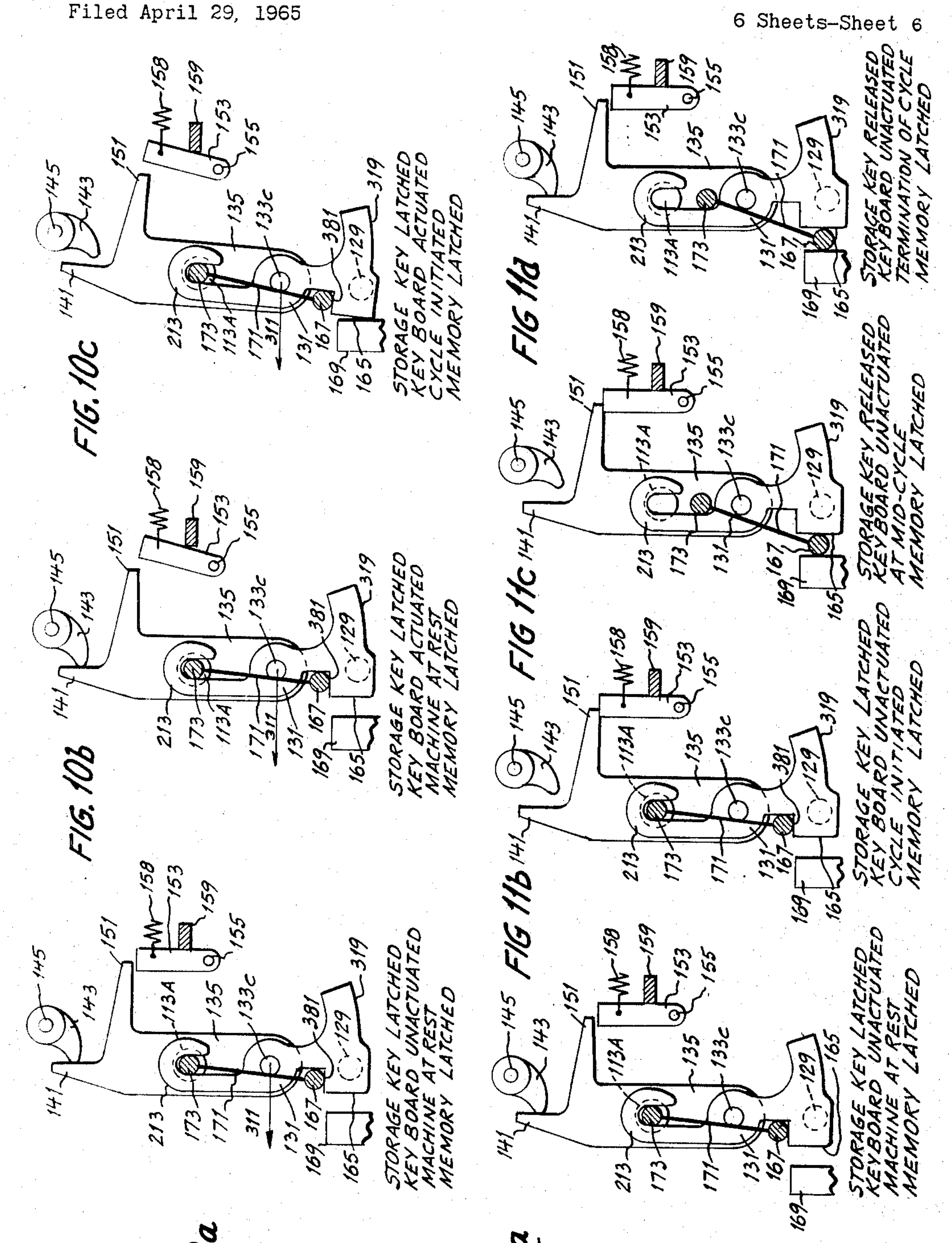

FIGS. 8*a* through 8*c* are schematic representations of some of the memory unit control elements of the office machine of FIG. 1 showing same in various cyclic positions thereof for a normal cycle of operation of the office machine and with no value stored therein;

FIGS. 9*a* and 9*b* are schematic representations of some of the memory unit control elements of the office machine of FIG. 1 showing same in various cyclic positions thereof for a recall cycle of operation of the office machine and with no value stored therein;

FIGS. 10*a* through 10*c* are schematic representations of some of the memory unit control elements of the machine of FIG. 1 showing the elements in various positions for a normal cycle of operation with a value stored; and FIGS. 11*a* through 11*d* are schematic representations of some of the memory unit control elements of the machine of FIG. 1 showing various positions for a cycle of operation to recall a stored value.

This invention accordingly provides a mechanical memory wheel unit engaging a conventional differential rack mechanism during at least part of each cycle of operation and contemplates providing a simplified control to normally maintain the unit latched in a position of engagement ready for recalling, which control effects either alternate storage and erasure in a cycle automatically or selectively converting the unit for long term storage. In response to initiation of a cycle other than total following absence of keyboard entry, the control keeps the unit latched and effects recall, but on initiation following keyboard entry of a new value or a total, the control first unlatches the unit, unless in long term storage, to permit movement out of engagement and into adjustment to zero position for automatic erasure during first movement of said rack mechanism from a rest position to a new value receiving or setting position, and then the control automatically admits the unit back into engagement with said rack mechanism during all of the half cycle of the return movement and relatches the unit on return to its rest and ready-to-recall position.

Operation of the office machine cycle initiating structure, such as a function key, and without entry of a new value into the keyboard and without use of a special key, maintains said latch latched and therefore said memory unit in its normal position of engagement with said differential rack mechanism and renders operation of said differential mechanism, and therefore of the office machine, dependent upon the value entered into the memory unit during the just previous operation of the office machine without loss of said value from the memory unit.

Operation of a storage key, on the other hand, not only maintains the latch latched and therefore said memory unit in its normal position of engagement with said differential rack mechanism, but also renders the zero stop structure for said memory unit inoperative to thereby permit unrestricted use of the office machine while still maintaining the value entered into the memory unit for any number of machine cycles, each value entered into the office machine during such cycles being first added to and then subtracted from said memory unit so that the value stored therein is not disturbed. Subsequent initiation of a machine cycle of operation, without entry of a value into the keyboard, effects a recall of the stored value and automatic release of the storage key to return the office machine to its normal condition of operation on a single cycle recall basis.

This invention is more specifically directed to an automatic recall and storage mechanism for a calculator utilizing a set of storage elements such as gear wheels which are normally latched in mesh between cycles and kept meshed normally independently of such latching for at least half of each cycle of machine operation in a position of meshing engagement with appropriately disposed teeth on the racks of the calculator. Said racks are normally moved for receiving value by sensing the position of set pins in a conventional entry mechanism such as a pinbox, and to be reset and to transfer said received value according to this invention to the memory unit.

Both the latch and zero stops are biased out, but they are controlled to be normally held in when the machine is at rest (both with and without value in storage) and when it is in recall operation.

Under bias the controls allow the latch out and move it back in before end-cycle, but only when there is normal operation, i.e. without either recall or storage. If there is no value in storage but a value is entered into the pinbox, or its equivalent, the storage wheels are unlatched at the beginning of a cycle of movement of said racks in said first direction and said storage wheels are automatically moved out of meshing engagement with said racks and positively reset to zero position. Prior to movement of said racks in said second direction but near the end of movement thereof in said first direction, said storage wheels are moved back into meshing engagement with said racks to be set to a position corresponding to the last value, entered into said racks.

No recall key is needed. All that is needed to recall a last entered value is to press any proper function key, i.e. other than the total key, and, in the absence of a new total or a new keyboard entry, the controls then stay in a condition where the storage wheels remain latched to said racks during the whole cycle to control the movement thereof to thus enter the last entered and stored value in the wheels into the racks in the next cycle so initiated. During this condition, the controls continue to hold the zero stops in. Pressing the total key effects a normal no-recall operation since the total key is a machine function initiating key (not proper for effecting recall) and since its operation also controls the rack and results in entry of value therein independently of the memory unit.

A storage key is added. Depression of it is operative on the controls to keep the storage wheels in mesh with the racks during any number of consecutive whole cycles and additionally permits the controls under bias to allow the zero stop out of entry of values into the racks without disturbing the stored value. During storage, initiation of a recall cycle by pressing a proper function key before making a new keyboard entry enters the stored value into the racks and automatically releases the storage key.

This invention involves the concept of not only providing an automatic control over the storage wheels dependent upon there not having been a new keyboard entry but also involves including an automatic resetting of the storage key. Recall is keyless since making the proper function or cycle initiating keys operate recall automatically, when no new keyboard entry is made, eliminates need for a manual recall key. Long term storage is manual by key, but manual storage release is eliminated by making release of the storage key automatic upon recall.

The detailed description hereinafter applies to a memory unit and its control adapted for incorporation into a calculator of the type into which a value may be entered by a keyboard entry and in which initiation of a cycle of machine operation thereafter is by pressing a proper function key. It is to be understood that the invention may be incorporated in any such type of office machine in which a value entered may be advantageously stored for use during an immediately following cycle of the machine or for use of any such preselected value during any subsequent cycle of the machine.

Figure 2:
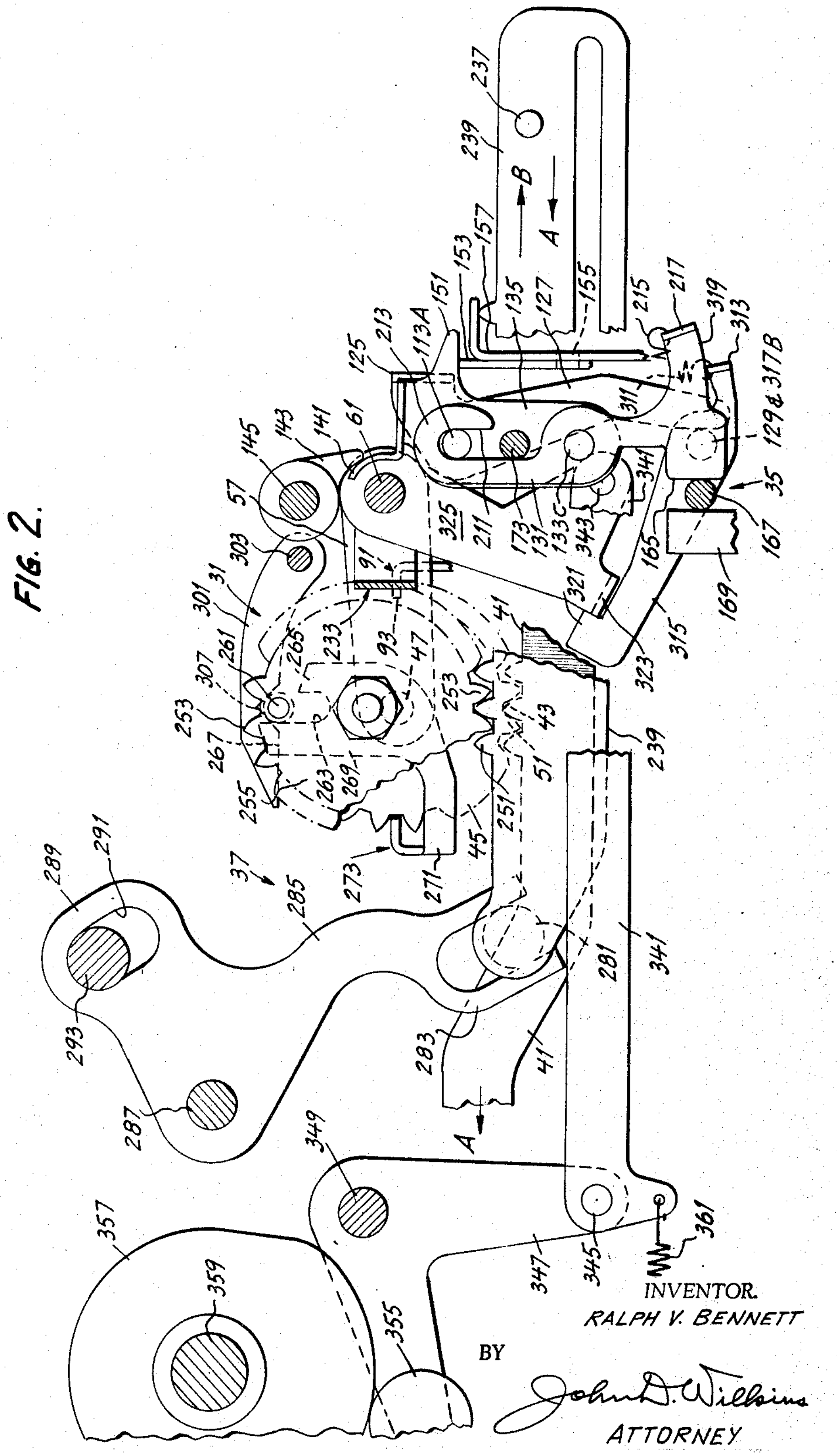
FIG. 2 is a partial left-hand elevational view of a portion of the office machine of FIG. 1 with some parts thereof removed to better show the memory unit and differential rack mechanism in the rest condition.

With reference to FIGS. 1 and 2, 31 generally designates a gear wheel memory unit disposed for selective movement into and out of engagement with a differential transfer mechanism 33, while 91 designates a zero stop member mounted for movement with respect to the memory unit, all of which is selectively controlled by coaction with each other and with a restoring or zeroizing mechanism 37 in conjunction with the control mechanism 35. The control necessiates only one additional key (FIG. 3) as more fully described below.

The gear wheel memory unit is normally latched in a position of engagement with a differential transfer mechanism 33 and is adapted to be unlatched by the control mechanism 35 for movement out of engagement with the differential mechanism and into a position of coaction with the restoring mechanism 37.

Differential mechanism 33 includes a plurality of racks 41 (usually one for each ordinal position of the calculator) disposed for movement in a value receiving or forward direction (in the direction of arrow A) and in a value entering or return direction (in the direction of arrow B). An appropriate number of gear teeth 43 are formed on each of the racks 41. Suitable conventional drive mechanism (not shown) is provided to effect the hereinbefore mentioned movements of the differential mechanism 33 and a cycle of operation of the calculator.

A plurality of gear wheels 45 (FIGS. 1 and 4), freely mounted on a shaft 47 for rotation in the memory unit 31 and spaced one from the other by a plurality of spacers 49 (FIG. 4), constitute the value receiving and storing elements for the memory unit; there being as many wheels 45 as desired and preferably one for each rack 41. An appropriate number of teeth 51 (FIGS. 1 and 4) are formed on each memory wheel 45 depending upon the notation used in the calculator. In this particular instance there are 20 teeth 51 for each wheel with one tooth on each wheel having a lug 53 extending into the space between it and the adjacent wheel 45.

One function of the control mechanism 35 is to effect latching of unit 31 in engagement with racks 41 and also to unlatch them for movement out of such engagement to allow restoration to zero.

A pair of memory unit support arms 57 (only one being shown in FIGS. 1, 2 and 4), mounting the ends of memory unit shaft 47, are fixedly secured, as by collars 59 (FIGS. 1 and 4) to a cross or rocker shaft 61 journalled in right and left side frame plates 63 (only one shown) appropriately mounted in the calculator.

A pair of end guide plates 69 (only one shown in FIGS. 1 and 4) depend from memory unit shaft 47 near the ends thereof and each mount a stud 71 which extends therefrom into a slot 73 formed in a frame plate 63. Studs 71 coact with the sides of their respective slots 73 to guide memory unit shaft 47, and memory wheels 45 during movement of teeth 51 thereof into and out of mesh with teeth 43 of racks 41, disposed between side plates 63 for meshing with the usual accumulators (not shown).

Figure 4:
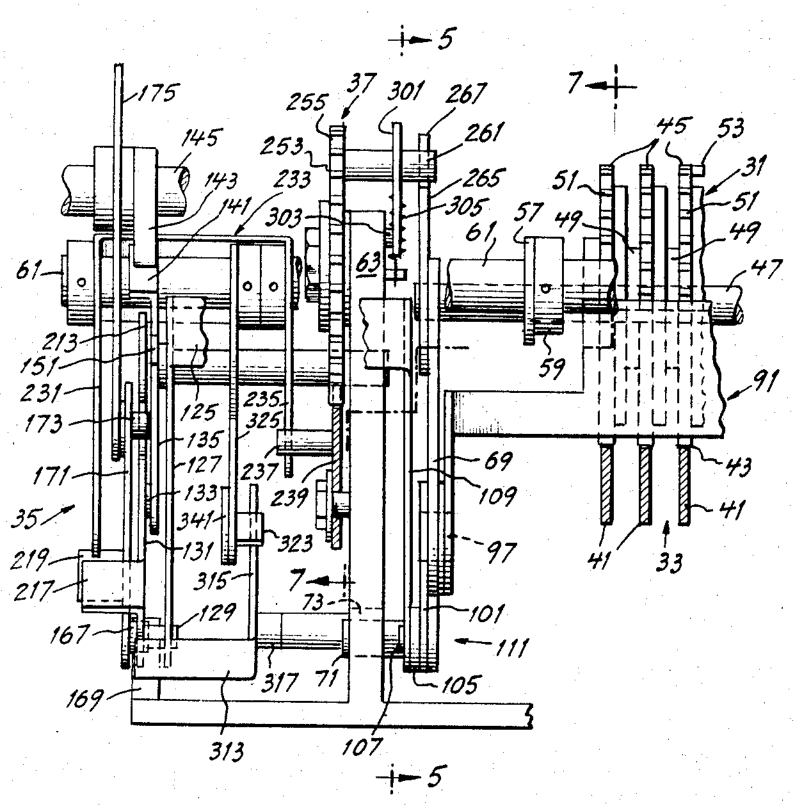
FIG. 4 is a partial front elevational view of the left side of the office machine.

A zero stop comb 91 (FIGS 1 and 4), spanning memory wheels 45 of memory unit 31, and formed with a plurality of teeth 93 (FIG. 1) each disposed in the space between adjacent wheels 45 for coaction with lugs 53, is secured to pivot stud 97 (only one is shown in FIGS. 1 and 4) on each side and is journalled in end plates 69.

Arm 101 is secured to one pivot stud 97 and connected by a pin 103 (FIG. 1) to a link 105 (FIGS. 1 and 4) pivotally connected as at 107 (FIG. 1) to right arm 109 (FIGS. 1 and 4) of a zero comb cradle 111 rockably mounted on a cradle shaft 113A (FIGS. 1 and 5) providing an upper, fixed center carried by frame plate 63 (FIG. 1) of the calculator.

A cross piece 125 (FIGS. 1, 2 and 4) of zero comb cradle 111 has fixed at its ends spaced cradle arms 109 and 127 and interconnects right arm 109 thereof with left arm 127 normally disposed in engagement with a stud 129 secured to the lower end of a control link 131 pivotally carried on a movable center defined by a stud 133C at the lower end of a control plate 135 rockably mounted on cradle shaft 113A.

Control plate 125 has a lip 141 and also a nose 151 acted on by a control cam 143 and a control latch 153, respectively, in a manner explained hereinafter.

Control cam 143 is driven by a restoring shaft 145 first positively in a counterclockwise direction so as to disengage from lip 141 and then in a clockwise direction so as to engage lip 141. Suitable mechanism (not shown) entrains control restoring shaft into the main drive system for the calculator to provide this oscillatory movement of shaft 145 during each machine cycle.

Plate 135 is returned in the counterclockwise direction about 113A (FIGS. 2 and 6) by cam 143 as it returns clockwise to reengage plate 135.

Lip 141 extends from control plate 135 into the path of movement of a control cam 143 secured to a shaft 145. Cam 143 either engages and blocks plate 135 in a rest or recall position, or oscillates to permit release of plate 135 from and restoration of it to that position respectively at the beginning and end of a cycle.

A nose 151 also formed on control plate 135, is disposed for blocking engagement with the upper edge of a control latch 153 pivotally mounted as at 155 to support 157 (FIG. 2). A spring 158 urges control latch 153 in the clockwise direction (FIGS. 1 and 8 to 11) to engage with a lug 159 operated in response to a pinbox or any other source of rack control other than the memory unit.

A blocking edge 165 (FIGS. 1 and 6) on one side of the lower end of control link 131 is normally disposed against a stud 167 sandwiched between same and a fixed stop 169 secured to a frame of the calculator.

A rock link 171 (FIGS. 1, 2 and 3) upon which lower stud 167 is disposed is rockably suspended on a pivot pin or upper stud 173 secured to the lower end of a link 175.

Figures 3, 5, 6:
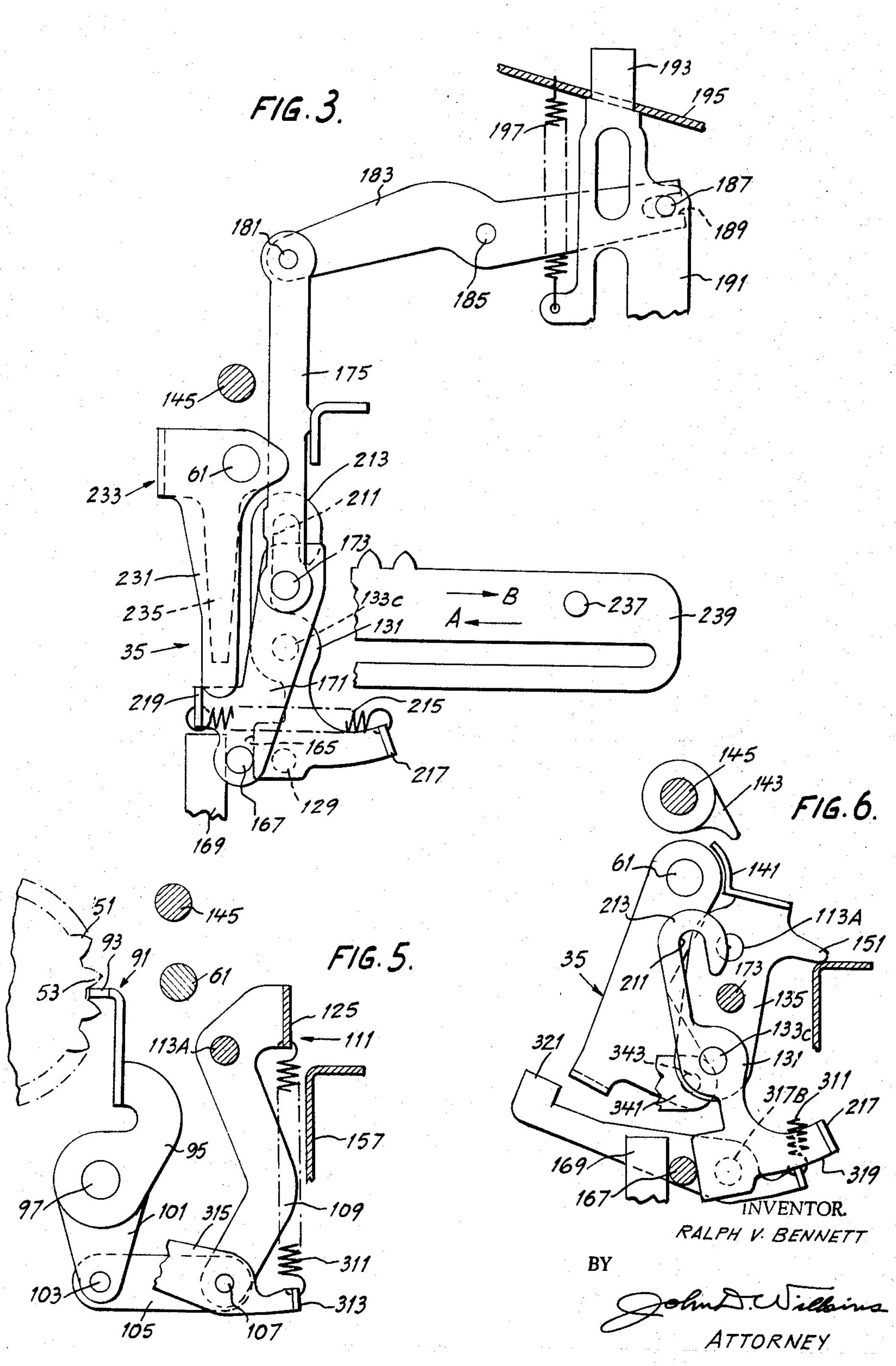
FIG. 3 is a partial left-hand elevational view of the same machine with some parts thereof removed to better show the storage key and associated elements thereof.
FIG. 5 is a fragmentary sectional view taken on line 5—5 of FIG. 4 with more parts removed to better show the zero stop comb and associated elements in the normal positions thereof.
FIG. 6 is a fragmentary view of the elements of FIG. 1 showing same positioned to unlatch the memory unit.

A pin 181 (FIG. 3) interconnects the top of storage link 175 to a lever 183 pivotally mounted as at 185 to a frame of the calculator and provided with a notch 189 receiving a stud 187 on a key stem 191 of a storage key 193 appropriately guided for up and down movement in a keyboard section 195 of the calculator. A spring 197, connected at one of its ends to key stem 191 and at the other of its ends to keyboard section 195, urges storage key 193 to its raised position and link 175 to its lowered position as shown in FIG. 3, unless stud 167 disposed on top of notch 381 of link 131 latches link 175 raised and key 193 depressed.

Pivot pin 173 of link 175 extends therefrom (FIGS. 1, 2 and 4) toward link 131 and is adapted for movement into and out of a slot 211 (FIGS. 1 and 2) formed in a goose neck portion 213 of control link 131.

A tension spring 215 (FIGS. 1 and 3), connected at one of its ends to an extension 217 of control link 131 and at its other end to an ear 219 formed on rock link 171, urges control link 131 in the clockwise direction about pivot pin 173 (FIG. 3) and rocks link 171 in the counterclockwise direction about pin 173. This action draws these links together at the bottom and normally maintains stud 167 and ear 219 of rock link 171 respectively (1) in engagement either in notch 381 or with edge 165 of control link 131 and (2) for storage key release engagement with a left arm 231 of a storage key release cradle 233.

This release cradle 233 is rockably mounted on cross shaft 61 and provided with a depending right arm 235 (FIGS. 1 and 4) extending operatively (only in the storage condition) into the path of a key releasing stud 237 carried by a zeroizing or restoring rack 239.

This rack together with restoring comb 273 is part of one suitable type of restoring mechanism 37; otherwise it functions to actuate stud 237 to achieve automatic storage release on recall.

A plurality of teeth 251 are formed on restoring rack 239 and are always disposed in mesh with teeth 253 of a restoring wheel 255. A restoring stud 261 (FIGS. 1 and 4) extends from restoring wheel 255 towards a slot 263 (FIG. 1) formed between a short finger 265 and a long finger 267 of an extension 269 formed on one arm 271 of restoring comb 273 also rockably mounted on memory unit shaft 47. A plurality of fingers 275 are formed on restoring comb 273 for disposition in the spaces between memory wheels 45 for coaction with lugs 53 thereof.

A drive stud 281 (FIGS. 1, 2 and 7) carried by restoring rack 239 is received in a forked end 283 of a restoring arm 285 rotatably carried by a shaft 287 (FIG. 2) fixed between the frames of the calculator and having formed in a drive portion 289 thereof a slot 291 adapted to receive a drive shaft 293 which also forms part of the conventional rack drive mechanism 33 of the calculator.

A restoring detent 301 (FIGS. 1, 2 and 4) rockably mounted on frame plate 63 by a pivot 303, is urged by a spring 305 (FIGS. 1 and 4) to seat notch 307 formed in detent 301 on stud 261 of restoring wheel 255 to detent same in its rest position (FIGS. 1 and 2).

A control spring 311 (FIGS. 1, 2 and 5) has one end thereof connected to cross piece 125 of zero comb cradle 111 and the other end thereof connected to an extension 313 of a latch 315 rockably mounted on a stud shaft 317B providing a lower fixed center secured to frame plate 63 of the calculator. Spring 311 urges left arm 127 of zero comb cradle 111 clockwise into engagement with stud 129 of control link 131, extension 313 of latch 315 counterclockwise into engagement with a radial surface or lower edge 319 on control link 131 radially curved from center 113A, and also urges a hook-end 321 of latch 315 out of engagement with a tab 323 formed on rocker arm 325 secured to the left end of cross shaft 61. Stud 133C on link 131 provides a mid-center for arcing about halfway between the fixed centers 113A and 317B.

A rocker slide 341 (FIGS. 1, 2 and 4) is pivotally connected as at one end by pivot 343 (FIGS. 1 and 2) to rocker arm 325 and by a second end pivot 345 (FIG. 2) to a bellcrank 347 rotatably carried by a stub shaft 349 secured to a frame (not shown) of the calculator. A follower roller 355 is disposed on bellcrank 347 for engagement with the surface of a cam 357 carried by a drive shaft 359 also entrained with the drive mechanism of the calculator. A spring 361 connected at one of its ends to the frame of the calculator and the other of its ends to rocker slide 341 maintains follower roller 355 in engagement with the surface of cam 357 and urges slide 341 to the left (FIG. 1) for yieldable movement.

A substantially conventional operator actuated, or power actuated, mechanism (not shown) is provided to actuate a main drive system for the calculator which manifests itself in motion of racks 41, drive shaft 293 and drive shaft 359 and when so actuated operates through what is commonly known as a cycle of operation for the calculator during which, among other things, differential mechanism 33 and restoring rack 239 are first moved in a value receiving or forward direction (in the direction of arrow A in FIGS. 1, 2, 3 and 7) and are then moved in a value entering or return direction (in the direction of arrow B in FIGS. 1, 2, 3 and 7), and during which cam 357 and control plate cam 143 are also appropriately driven by their drive shafts 359 and 145 respectively.

*Machine condition—No storage, no recall*

Prior to initiation of a cycle of operation and with no value stored in memory unit 31, the elements of the calculator are as shown in FIGS. 1, 2, 3, 5, and 8*a*.

Restoring rack 239 is in its rightmost (FIG. 2) position having been moved there at the termination of the previous cycle of operation for the calculator by restoring arm 285 driven by shaft 293 incident to the normal restoring operation for racks 41, which are also in their rightmost position.

Cam 357 is disposed with the surface thereof contacting follower roller 355 to maintain control slide 341 in its rightmost position against the action of spring 361 thus to maintain arms 57 of memory unit 31 and memory unit shaft 47 in their lowered positions with teeth 51 of memory wheels 45 in engagement with teeth 43 of racks 41.

Control plate cam 143 is in engagement with lip 141 of control plate 135 to maintain same with its stud 133C substantially under shaft 113A and with nose 151 slightly above control latch 153 to permit the latch to seat under the nose in blocking relationship.

Storage key 193 is in its raised (FIG. 3) position and therefore link 175 thereof is in its lowered position with lower stud 167 thereof disposed between fixed stop 169 and a blocking surface or edge 165 of control link 131.

Spring 311 acting on zero comb cradle 111 maintains arm 127 thereof in engagement with stud 129 of control link 131 whose stud 129, aligned with center 317B, blocks the cradle 111 and at the same time urges control link 131 into engagement with stud 167 of rock link 171 and stud 167 in engagement with fixed stop 169. Spring 311 furthermore, acting on extension or tail 313 of latch 315, maintains same in engagement with curved surface 319 of control link 131 which in turn holds tail 313 down and hook-end 321 of latch 315 up in engagement with tab 323 of rocker arm 325 to latch arm 325 against movement under action of spring 361. This prevents rotation of arm 325, of cross shaft 61, and arms 57 carried thereby, thus locking memory unit shaft 47 and memory unit 45 in their lowered positions with teeth 51 thereof in engagement with teeth 43 of racks 41. Cradle 111 and latch 315, thus controlled, are in recall position normally with the aforementioned three centers in line.

The aforementioned condition of control mechanism 35 of the calculator is schematically illustrated in FIG. 8*a* wherein: control link 131 is shown with its studs 129 and 133C thereof disposed with the latter substantially vertically above the former aligned with center 317B which places the aforementioned three centers in line; blocking edge 165 of control link 131 is disposed in engagement with stud 167 which is in turn in engagement with stop 169; and spring 311 acts along a line passing through stud 133 and attempts to pivot control link 131 counterclockwise about a fulcrum on stud 167 but is prevented from doing so by interference of nose 151 and lip 141, respectively, with control latch 153 and control cam 143.

*Normal operation*

When either (1) a proper function key is depressed following a last keyboard entry, or (2) the total key is depressed, the machine operation is normally one of single cycle erasure and storage, i.e. one of no recall and no long term storage.

Keyboard action such as either entry of a value or a total results in movement of lug 159 responsive thereto (FIG. 1) away from latch 153 permitting spring 158 to rock latch 153 clockwise from under nose 151 of control plate 135.

This stage is schematically shown in FIG. 8*b* wherein it can be clearly seen that the normal bias of spring 311 to rock control link 131 about stud 67 as a fulcrum is still prevented by the presence of cam 143.

Initiation of a cycle of operation is by appropriate function key including the total key whereupon the drive mechanism suitably coupled to shaft 145 results in movement of cam 143 in the counterclockwise direction away from lip 141 of control plate 135 (FIG. 6).

Control link 131 is now free of both blocking latch 153 and cam 143, thus permitting spring 311, by its action through extension 313 of latch 315 on curved surface 319 of control link 131, to rock control link 131 in the counterclockwise direction (FIG. 6) about a fulcrum on stud 167 of rock link 171 to establish the condition shown in FIG. 8*c*.

The resulting movement of link 131 leaves stud 129 substantially aligned as before so as to still block cradle 111 at arm 127 and hold the zero stops 93 in.

Concurrent angular upward movement of curved surface 319 of control link 131 is sufficient, however, to permit a counterclockwise rotation of latch 315 about stub shaft 317B (FIG. 6) under bias of spring 311 for arcing center 133C out of line and removing hook-end 321 from its position of engagement with tab 323 of control arm 325.

Cam 357 is rotated in the clockwise direction (FIG. 2) by its drive shaft 359 concurrently with the aforementioned movements of shaft 145 and control link 131; this lets spring 361 rock bell crank 347 in the clockwise direction about stub shaft 349 to maintain follower roller 355 in engagement with cam 357. Such action of spring 361 also moves rocker slide 341 in the direction A for rocking arm 325 (now no longer restrained by hook-end 321 of latch 315), cross-shaft 61 secured thereto and arm 57 of cross-shaft 61 in the clockwise direction (FIG. 1) about the axis of rotation of cross-shaft 61 to raise memory unit shaft 47 and memory wheels 45 and thus move teeth 51 of memory wheels 45 out of their positions of engagement with teeth 43 of racks 41.

Figure 7:
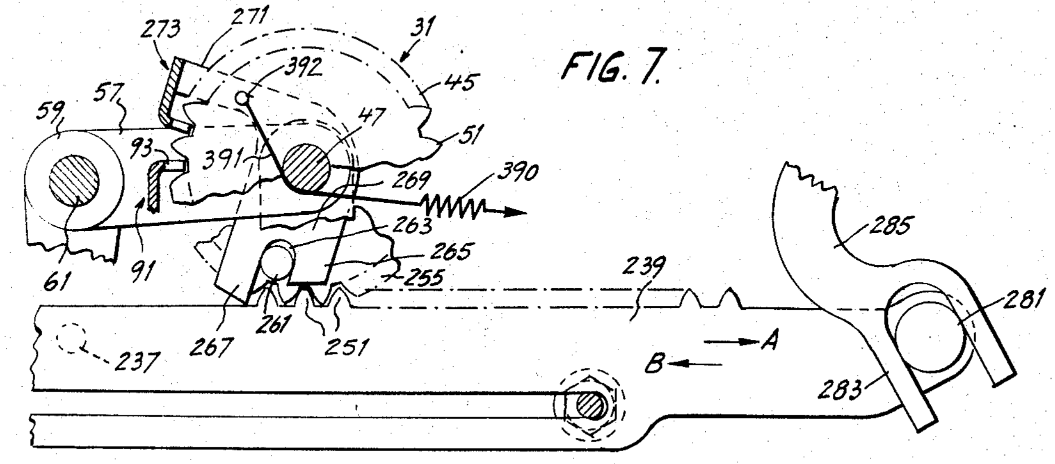
FIG. 7 is a fragmentary sectional view taken on line 7—7 of FIG. 4 with parts removed to better show the restoring rack, wheel, and restoring combine in the restored positions thereof together with another form of restoration which may be substituted for the rack and wheel.

The raising of memory unit shaft 47 also seats stud 261 of restoring wheel 255 in notch 263 (FIG. 1) between short finger 265 and long finger 267 of extension 269 of arm 271 of restoring comb 273. Drive shaft 293 (FIG. 2) moving in conjunction with the drive mechanism for differential mechanism 33 (in direction of arrow A) rocks restoring arm 285 in the clockwise direction (FIG. 1); forked end 283 thereof acting on stud 281 of restoring rack 239 in the direction A. Teeth 251 of moving restoring rack 239 transmit the motion thereof to teeth 253 of restoring wheel 255 to drive same, and stud 261 carried thereby, in a clockwise direction (FIG. 1) about shaft 47, and since short finger 265 is in the path of rotation of stud 261 to drive extension 269, arm 271 and restoring comb 273 in the clockwise direction (FIG. 1) about memory shaft unit 47. Any lugs 53 of memory wheels 45 which lie in the path of teeth 275 of restoring comb 273 will therefore be engaged by their respective teeth 275 and the associated memory unit wheels 45 will be returned to their zero positions (FIG. 7). Thus, a previous value entered in the last half of the previous cycle is cancelled or erased.

At this point in the cycle, just before mid-cycle, cam 357 acts on follower roller 355 to rock bell crank 347 in the counterclockwise direction about stub shaft 349 (FIGS. 1 and 2) moving slide 341 in the direction B and against the action of spring 361 to pivot rocker arm 325, cross shaft 61, and arm 57, in the counterclockwise direction about the axis of rotation of cross shaft 61 (FIG. 1). This effects a lowering of memory unit shaft 47 and wheels 45 thereon to reengage teeth 51 of memory wheels 45 with teeth 43 of racks 41 at mid-cycle, where cam 143 remains where it was moved counterclockwise, leaving unit 31 unlatched but in mesh.

Subsequently, the drive mechanism of the calculator effects movement of differential mechanism 33 in the direction of arrow B which action, through drive shaft 293, rocks restoring arm 285 in the counterclockwise direction (FIG. 1) about shaft 287 to move restoring rack 239 in the direction B driving restoring wheel 255, stud 261 thereof, extension 269, arm 271 and restoring comb 273 in the counterclockwise direction (FIG. 7) back to their rest positions (FIGS. 1 and 2) wherein restoring stud 261 is again seated in notch 307 of detent 301.

It is during this restoring movement of racks 41 and 239 (in the direction of arrow B) that the value last received in the racks is entered into memory wheels 45 of memory unit 31.

Upon termination of the cycle of operation, the FIG. 8*a* condition is again set up. Concurrently, control shaft 145 has rocked control plate cam 143 back in the clockwise direction (FIG. 6) to engage lip 141 and return control plate 135 turning it about shaft 113A counterclockwise (FIG. 2) thereby moving stud 133C, and the middle center it defines, back into vertical alignment with stud 129 of control link 131 and thus rock control link 131 in the clockwise direction about its fulcrum on stud 167. Meanwhile curved surface 319 of control link 131 acting on extension 313 rocks latch 315 in the clockwise direction (FIG. 1) about stub shaft 317B to again latch rocker arm 325. At this stage, around the beginning and end of the cycle, cam 357 maintains memory wheels 45 of memory unit 31 with teeth 51 thereof in engagement with teeth 43 of the racks 41. The end-cycle condition shown in FIG. 8*a* is thus reestablished with the aforementioned centers again in line.

*Recall operation—No storage*

To recall the value so entered in memory unit 45, the operator need only refrain from entry of value into the keyboard and merely initiate a cycle of operation of the calculator by the conventional mechanism provided therefor.

It is of course understood that prior to such action, the elements are as schematically shown in FIG. 9*a* identical to FIG. 8*a* with both latch 153 and cam 143 again preventing movement of control link 131 and thus maintaining latch 315 in position to prevent movement of control arm 325 and prevent shifting of memory unit 31 to thereby prevent movement of teeth 51 of memory wheels 45 from their positions of engagement with teeth 43 of racks 41 as shown in FIG. 2.

Upon initiation of a cycle of operation for the calculator the drive mechanism thereof, as before, moves control plate cam 143 in a counterclockwise direction (FIG. 1) and away from lip 141 of control plate 135 to establish the condition shown in FIG. 9*b*.

Due to the presence of the lug 159 set by pin box of the calculator, latch 153 remains under nose 151 of control plate 135 preventing any movement thereof and therefore maintaining control link 131 in the position shown with the three centers in line which maintains cradle 111 in the recall position where comb 91 is as shown in FIG. 5. The action of spring 311 is therefore to no avail and latch 315 remains in the recall position of engagement of control arm 325 to latch the memory unit 31 in engagement with differential mechanism 33 for both the forward (in direction A) and reverse (in direction B) movements thereof. The forward movement of differential mechanism 33 is therefore controlled by the limiting of lugs 53 of the various memory wheels 45 against teeth 93 of zero stop comb 91. During the restoring movement of differential mechanism 33 (in direction B) the value is again reentered into memory wheels 45 for subsequent use. Upon termination of the cycle of operation, the FIG. 9*a* condition is again establishd.

*Storage*

To store a value so entered in memory unit 31 for use in any subsequent cycle of operation, the operator need only depress storage key 193 moving same against the action of spring 197 to pivot lever 183 in the clockwise direction (FIG. 3) about pivot 185 and raise link 175, moving stud 173 thereof into slot 211 of gooseneck portion 213 of control link 131 to provide a center at 173 approximately in line with center 113A and moving stud 167 to withdraw it from between stop 169 and blocking edge 165 of control link 131. Spring 215, acting on both rock link 171 of link 175 and extension 217 of control link 131, thereafter moves stud 167 into a notch 381 formed in control link 131 to lock storage key 193 in its depressed condition.

This condition of conversion to long term storage is schematically shown in FIG. 10*a*. Here spring 311 through engaged arm 127 and stud 129 attempts to rock control latch 153 and control plate cam 143, which hold plate 135 and link 131 with midcenter 133C vertically in line with center 113A and the center of 129 coaxial with that of 317B. Latch 315 and zero comb 111 remain as shown in FIGS. 1 and 2.

*Normal machine operation—Value stored*

Entry of a value into the calculator keyboard effects an escapement of the pinbox (not shown) thereof and of lug 159 carried by said action away from control latch 153 permitting spring 158 thereof to rock latch 153 in the clockwise direction about pivot 155 (FIG. 1) and remove latch 153 from beneatth nose 151 of control plate 135. This establishes the FIG. 10*b* condition.

Operator initiation of a cycle of operation of the calculator following such keyboard entry then rocks control plate cam 143 away from lip 141 of control plate 135 for freeing plate 135 for clockwise movement about shaft 113A and permitting spring 311 through its action on arm 127 of cradle 111 and sliding of extension 313 of latch 315 on curved surface 319 of control link 131 to rock control link 131 in a clockwise direction about upper stud 173 engaged in slot 211 to thus establish the condition shown in FIG. 10*c*. This condition, however involving pivoting of surface 319 on the same radius from center 113A at stud 173, does not permit the counterclockwise movement of latch 315 (FIG. 1) about stub shaft 317B so as to move hook-end 321 thereof away from tab 323 of control arm 325. Thus, rocker arm 325 remains latched and teeth 51 of memory wheels 45 remain in their positions of engagement with teeth 43 of racks 41.

The clockwise movement (FIG. 1) of control link 131 about upper stud 173 in portion 213 does, however, result in a corresponding clockwise movement of stud 129, carried by control link 131, at notch 381, permitting left arm 127 of zero comb cradle 111, and therefore zero comb cradle to rock in the clockwise direction (FIG. 1 or FIG. 5) about shaft 113A under bias of spring 311. Arm 109 of cradle 111, through its pivotal connection 107 with link 105 effects a clockwise rotation of link 101 and arm 95 about pivot stud 97 (FIG. 5) to move zero comb 91 and teeth 93 thereof out of the path of rotation of lugs 53 of storage wheels 51 on memory wheels 45.

Entry of any number of ensuing values into the calculator can now be accomplished in a substantially normal manner, because such values subsequent to the value selected for storage will be rolled out and in equally and will not be entered into memory wheels 45 as is done during a normal machine operation (storage key undepressed). The stored value will not be disturbed even though teeth 51 of memory wheels 45 remain engaged with teeth 43 of racks 41. Latch 315 remains in engagement blocking rocker arm 325. During the movement of racks 41 in such a cycle of operation (in direction A) a value entered into the calculator will be added (really subtracted) to the value stored in the memory unit 31 (it being understood that there are no tens transfers) and memory wheels 45 will be rotated in the clockwise direction (FIG. 1); the absence of teeth 93 of zero stop comb 91 will permit such movement of memory wheels 45 by allowing lugs 53 thereof to be carried past the zero positions thereof if required. On return movement of racks 41 (in the direction of B) the value so added will be subtracted (really added) from memory unit 31 and wheels 45 thereof will again be returned to the position wherein the value stored therein is again returned thereto. It will thus be seen that the normal operation of the calculator will continue with no net effect i.e. without disrupting the values stored in memory unit 31.

It should also be noted that during the movement of restoring rack 239 in direction A that release stud 237 thereof will not operatively engage right arm 235 of release cradle 233 since such has not been moved counterclockwise sufficiently by the action of spring 215 on left arm 231 to put arm 235 into the path of movement of stud 237. Such movement at mid-cycle will result in (1) no rotation (FIG. 3) of release cradle 233 in a clockwise direction about cross shaft 61, and, (2) due to the lack of coaction between arm 231 of cradle 233 with ear 219 of rock link 171, in no clockwise rocking of rock link 171 so that stud 167 remains in notch 381 above the upper latch surface thereof of control link 131, thereby keeping link 175 up and storage key 193 in its depressed condition.

The cycle condition between beginning and ending is shown in FIG. 10*c*, where control link 131 is clockwise, thereby allowing arm 127 and its cradle 111 to remain clockwise so as to maintain the zero stops 93 out of the path of zero lugs 53, until between cycles. Thus, during storage between cycles of normal machine operation the zero stops restore while the latch remains continuously locking the memory wheels in mesh from cycle to cycle.

*Recall operation—Value stored*

Should it be desired to recall the value so stored, the operator need only initiate operation of the machine as in a normal recall cycle.

It should be remembered that storage key 193 is still depressed and link 175 thereof still raised so that stud 173 is in slot 211 of gooseneck portion 213 of control link 131 and stud 167 is in notch 381 to maintain storage key 193 depressed. Control link 131 is as schematically shown in FIG. 11*a* with spring 311 attempting to rock same in the clockwise direction about stud 173 which happens to be on center with shaft 113A but is prevented from doing so by the presence of control latch 153 and control cam 143.

Initiation of a cycle of operation by the operator, or by other mechanism provided with the calculator, rocks control cam 143 in the counterclockwise direction (FIG. 1) moving same away from lip 141 of control plate 135.

Since the keyboard has not been actuated and the pinbox has not been moved, lug 159 of the pinbox remains in engagement with latch 153, which therefore remains beneath nose 151 to hold control plate 135 as shown in FIG. 1 and to maintain stud 133C in alignment with stud 129 of control link 131 along an imaginary vertical line as schematically shown in FIG. 11*b*.

Since control plate 135 cannot move, control link 131 remains in the position shown in FIG. 1 and zero comb 91 remains with teeth 93 thereof in the path of rotation of lugs 53 of memory wheels 45. Movement of differential rack mechanism 33 in the value entering direction (in direction A) is therefore controlled by the limiting of lugs 53 of memory wheels 45 against teeth 93 of zero comb 91. Thus, the selected value in storage is recalled to be the next value received in the racks for recall.

In addition, during such forward movement in direction A, to effect release of the storage key, stud 237 of restoring rack 239 moves against right arm 235 of release cradle 233 (FIGS. 1 and 3) to move left arm 231 thereof clockwise against ear 219 of rock link 171. However, since control plate 135 is locked in position by latch 153 and since control link 131 is therefore immobilized by the fixed alignment of stud 133C of control plate 135 and of stud 173 disposed up in slot 211 thereof, control link 131 does not move under the action of spring 215 when rock link 171 so moves. Stud 167 of rock link 171 therefore moves out of latch 381 of control link 131. As this happens, key stem spring 197 (FIG. 3) acting on stem 191 lifts stud 187 and rocks lever 183 in the counterclockwise direction (FIG. 3) on pivot 185 to drop link 175 and again place lower stud 167 of rock link 171 between stop 169 and edge 165 of control link 131. This establishes the condition of automatic storage release at mid-cycle shown in FIG. 11*c*.

Differential mechanism 33 and control plate cam 143 are thereafter returned to their rest positions (FIG. 1) with restoring rack 239. The normal condition is again reestablished for the calculator with no value stored therein and storage key 193 thus automatically released is in its undepressed condition as shown schematically in FIG. 11*d*.

From the above description it will thus be seen that there has been provided, for an office machine, a novel and improved memory unit, of the gear wheel type, with novel, improved, and simplified controls. Although of extremely simple construction and operation when compared to other such mechanisms, this invention provides for automatic entry into the memory unit of each value last entered into the office machine, for automatic recall of the last previous value so entered on a single cycle recall basis when no further keyboard entry is made by merely initiating a cycle of operation for the machine, for storage of said value through any number of machine cycles regardless of any values entered into the machine during such cycles, and for recall of any value so stored by again merely initiating a cycle of operation in the machine, in the absence of keyboard entry.

The embodiment described hereinbefore may be changed by those skilled in the art.

For example, instead of using the forked extension 269 of the restoring comb arm 271, the driving stud 261, the stud bearing restoring wheel 255, rack 239 and the restoring arm 285 connected to the driving means for zeroizing means, including comb 273 may involve drive by bias such as a restoring spring 390 (see FIG. 7) attached at one end to a pull cord 391 the other end of which is attached at connection 392 to restoring comb 271 to act on lugs 53 over enough of an arc of comb oscillation on wheel shaft 47 to alone put the wheels in zero condition. With this modification, restoring comb 271 would always act on one or more tooth lugs 53 of the memory wheels. With this modification, restoring member 239 would be changed to become a toothless slide and remain for carrying control stud 237 for cyclic operation in synchronism with the machine drive for acting on right arm 235 of cradle 233.

This and other modifications, changes and embodiments may be made without departing from the spirit and scope of this invention as set forth in the appended claims.

What is claimed is:

1. In a calculating machine of the class described selectively settable to a numerical value such as that last listed or accumulated therein in response to one of a keyboard entry and total and driveable upon initiation of function of said machine in a cycle of operation, the combination comprising (1) a differential transfer mechanism having a plurality of racks for movement in said cycle first in a forward, value receiving direction to a set position of said mechanism corresponding to said numerical value last received and entered therein, and then in a return, value entering stroke;

(2) a mechanical memory unit mounted for going into and out of coaction with said differential transfer mechanism and including a corresponding plurality of memory elements for meshing with said differential transfer mechanism racks during said coaction, said elements being adjustably movable to have said value entered therein and be set to a value received condition and oppositely to be normally set to a zero condition;

(3) movable support means mounting said memory unit and operative for cyclicly shifting said elements yieldably out of and positively back into said mesh, said support means normally holding said elements in mesh during and at the end of said return stroke;

(4) zero stop means mounted on said support means and normally held in a first position engageable with and for arresting said elements in said zero condition and movable under bias to a second position out of engagement of said elements;

(5) restoring means operative for moving said elements to said zero condition during said forward value receiving movement when said memory unit and elements respectively are out of coaction and mesh, whereby the last value previously entered in said elements is erased therefrom, said restoring means being ineffective when said memory elements are in mesh with said differential transfer;

(6) latch means normally engaged with said support means for locking said support means against shifting of said memory unit and its elements out of said mesh and to thus limit movement of said differential transfer mechanism racks in said forward value receiving direction to a differentially set position governed only by value last entered in said meshed elements for retention thereof for single cycle recall and re-entry in said machine, said latch means being selectively disengageable from said support means to allow said shifting out of mesh; and (7) a cycle control means operative in response to said initiation following one of said keyboard entry and total to actuate said latch means for unlocking said support means for a cycle and operable in response to said initiation in the absence of said keyboard entry and total to actuate said latch means for locking said support means, whereby said machine is conditioned for automatic recall without actuation of a recall key.

2. The calculating machine combination of claim 1 including a movable first control member mounted for operatively engaging said zero stop and latch means and for pivotal movement thereof with respect to either of a pair of spaced ends of said first control member out of and back into a normal position of said member at which said first control member is operative to dispose said zero stop in and latch means in with respect to said path and for said locking;

a movable second control member carrying a pair of spaced blocking means, said second control member being normally positioned with the first of said blocking means operative at one end of said first control member to define a non-storage condition of machine function and being selectively positioned by a storage key with the second of said blocking means operative at the opposite end of said first control member to define a storage condition of machine function;

means biasing said latch means to unlock said supporting and shifting means and biasing said zero stop means out of said path of engageability with said memory unit wheels, said biasing means urging said first control member to move out of said normal position;

intermediate blocking means normally operative on said first control member when said machine is at rest between cycles and also during a cycle in the absence of one of said keyboard entry and total, to coact with one of said pair of first and second blocking means for holding said first control member in said normal position to define a recall machine function condition, said intermediate blocking means being inoperative during a cycle resulting from said initiation following depression of a machine function key so long as one of said keyboard entry and total are being made whereupon said first control member is free for said pivotal movement out of its normal position under the urging of said biasing means with respect to said one of said pair of blocking means to define a non-recall machine function condition; and storage key release means operative on said second control member during said movement in said first forward direction to reposition it with said first blocking means again operative at said one end of said first control member and with said second blocking means inoperative at said opposite end.

3. The calculating machine combination of claim 2 wherein said first control member adjacent said one end has a shoulder and is urged under bias toward said second control member adjacent said first blocking means, said shoulder engaging with said first blocking means under said bias for putting said members into latching relationship when said second blocking means is operative at said opposite end; said storage key release means being operative against said bias to disengage said shoulder and first blocking means.

4. In a calculating machine of the class described, selectively settable in response to initiation of a cycle of machine function to a numerical value such as the last listed or accumulated figure therein in response to one of keyboard entry and total, said machine including a differentially settable memory unit of the digit element type, and a differential transfer mechanism operable for receiving value therein in response to forward movement of said mechanism to a set position corresponding to said value and for entering said received value into said memory unit by in turn setting the same normally in response to return movement of said mechanism, said machine being driveable for effecting a cycle of machine function resulting in said forward and return movement of said mechanism; the combination comprising (a) means for supporting and shifting said memory unit out of value entering engagement with said mechanism and back into said engagement before said return movement during and at the end of which said supporting and shifting means normally maintains said engagement so that each said value is normally enterable into said unit during said engagement and return movements;

(b) zeroizing means including a zero stop urged under bias to be disengageable from said memory unit and also disposed in against said bias to be normally engageable with said unit in the path of its digit elements for arresting said unit in a zero condition and including a restoring member for normally moving said unit digit elements to said zero condition during said forward movement when said unit and transfer mechanism are shifted out of said engagement, where said transfer mechanism is allowed to escape for receiving a new value and whereby any numerical value previously entered in said unit is erased therefrom; and (c) latch means normally disposed in to be normally operable for locking said supporting and shifting means against putting said unit out of said engagement during a cycle, whereby said zeroizing means is rendered ineffective and said forward movement of said engaged differential mechanism in the next consecutive cycle is limited to a differential set position governed only by and corresponding to the value last entered into said unit, for recall entry thereof in said machine in said next consecutive cycle, said latch means also being urged under said bias to be operable for unlocking said supporting and shifting means during a cycle to allow said unit out of said engagement;

(d) a first control member normally positioned for disposing said zero stop in for unit digit element engagement normally and for disposing said latch means in for said locking normally, said first control member being mounted for movement into and out of its normal position;

(e) a storage key;

(f) a second control member operatively connected to said key and carrying blocking means and being selectively movable in one direction by said storage key when manually actuated for applying said blocking means to one end of said first control member to define a storage condition of machine function, said second control member being movable in the opposite direction for applying said blocking means to an opposite end of said first control member to define a non-storage condition of machine function;

(g) an intermediate control cam normally applied to said first control member between said ends and responsive to said initiation of a cycle for disengaging from said first control member during either of a cycle of normal non-recall function and a cycle of recall function;

(h) an intermediate control latch normally applied to said first control member between said ends as a precondition to said recall function and responsive to one of said keyboard entry and total for disengaging from said first control member as a precondition to said normal non-recall function; said (i) an automatic storage key release means responsive to the simultaneous occurrence of (1) said forward movement during said cycle of machine function, (2) said second member having been moved in said one direction, and (3) said intermediate control latch remaining applied to said first control member to move said second control member in said opposite direction and at the same time deactivate said storage key;

said first control member being movable out of its normal position one way to allow said latch means out for said unlocking for normal non-recall function without value in storage when both said intermediate control cam and latch are disengaged from said first control member; and said first control member being movable out of its normal position an opposite way to allow said zero stop out of said path for normal non-recall function with value selected and undisturbed in storage, when both said intermediate control cam and latch are disengaged from said first control member.

5. The calculating machine combination of claim 4 wherein said first control member is pivotally movable and is formed adjacent said one end with one connection, said member being formed with a surface arcuately extending with respect to said opposite end of said member to define a second connection spaced from said one end; said one connection being operative under said bias to pivot with said member moving said opposite way about said blocking means applied at said opposite end for allowing said zero stop out while said second connection substantially remains radially unmoved with respect to said blocking means applied at said opposite end; said second connection being operative under said bias to pivot with said member moving said one way about said blocking means applied at said one end for allowing said latch means out for unlocking while said one connection substantially remains radially unmoved with respect to said blocking means applied at said one end.

6. In a cyclicly operable business machine a value storage and recall mechanism comprising:

(a) a differentially settable memory unit;

(b) a differential transfer mechanism;

(c) means for moving said transfer mechanism to a set position corresponding to a key entered value during the first half of a cycle of operation of said machine;

(d) erasing means for actuating said memory unit to its zero condition during the first half of said cycle of operation;

(e) means for shifting said memory unit into engagement with said transfer mechanism at the end of said first half cycle whereby said value is transferred to said memory unit during the second half of said cycle;

(f) means for temporarily disabling said erasing means thus to retain the value set in said memory unit for use during subsequent cycle of machine operation;

(g) control means selectively operable to latch said memory unit and transfer mechanism releasably in engagement with each other while said erasing means is disabled thus to retain the value last entered into said memory unit for recall when desired;

(h) means for initiating cycles of operation of said machine; and (i) means responsive to a cycle of operation initiated by said cycle initiating means to effect recall without erasure of said retained value.

7. A cyclicly operable business machine according to above claim 6 and further comprising; means responsive to a value entry and total taking cycle of said machine to unlatch said memory unit during said first half cycle and simultaneously enable said erasing means to erase said stored value and condition said memory unit to receive the value being entered during said second half cycle.

References Cited

UNITED STATES PATENTS 3,026,030 3/1962 Gelling -------------- 235—79

RICHARD B. WILKINSON, *Primary Examiner.*

STEPHEN J. TOMSKY, *Examiner.*

L. R. FRANKLIN, *Assistant Examiner.*